United States Patent
Gross et al.

(10) Patent No.: US 12,222,361 B2
(45) Date of Patent: Feb. 11, 2025

(54) METHOD FOR DISPENSING A LIQUID SAMPLE BY MEANS OF A DISPENSING APPARATUS

(71) Applicant: cytena GmbH, Freiburg (DE)

(72) Inventors: Andre Gross, Freiburg (DE); Julian Riba, Freiburg (DE); Jonas Schöndube, Freiburg (DE)

(73) Assignee: CYTENA GMBH, Freiburg (DE)

( * ) Notice: Subject to any disclaimer, the term of this patent is extended or adjusted under 35 U.S.C. 154(b) by 193 days.

(21) Appl. No.: 17/780,045

(22) PCT Filed: Nov. 27, 2020

(86) PCT No.: PCT/EP2020/083662
§ 371 (c)(1),
(2) Date: May 26, 2022

(87) PCT Pub. No.: WO2021/105380
PCT Pub. Date: Jun. 3, 2021

(65) Prior Publication Data
US 2022/0413002 A1    Dec. 29, 2022

(30) Foreign Application Priority Data

Nov. 27, 2019   (LU) ........................................ 101494

(51) Int. Cl.
*G01N 35/10* (2006.01)
*B01L 3/02* (2006.01)
*G01N 15/10* (2024.01)

(52) U.S. Cl.
CPC ........ *G01N 35/1016* (2013.01); *B01L 3/0293* (2013.01); *G01N 15/10* (2013.01); *G01N 2015/1006* (2013.01)

(58) Field of Classification Search
CPC .............. G01N 35/1016; G01N 15/10; G01N 2015/1006; B01L 3/0293; B01L 2200/061;
(Continued)

(56) References Cited

U.S. PATENT DOCUMENTS

| | | | |
|---|---|---|---|
| 8,834,793 B2 * | 9/2014 | Koltay | C12M 41/48 347/68 |
| 2013/0037623 A1 * | 2/2013 | Yamaguchi | G01N 15/1492 239/11 |

(Continued)

FOREIGN PATENT DOCUMENTS

| | | |
|---|---|---|
| CA | 3095848 A1 | 10/2019 |
| CA | 3096701 A1 | 10/2019 |

(Continued)

*Primary Examiner* — Helen C Kwok
(74) *Attorney, Agent, or Firm* — Hodgson Russ LLP (57) ABSTRACT

A method for dispensing a liquid sample by means of a dispensing apparatus in which it is determined whether a particle condition is satisfied, wherein the determination comprises checking whether at least one target particle present in a liquid of the liquid sample is contained in a monitoring region of the dispensing apparatus, wherein the monitoring region comprises a discharge region and a buffer region, wherein the buffer region is a region from which the at least one target particle is movable into the discharge region during a time delay between the determination of whether the particle condition is satisfied and an output operation of the dispensing apparatus. The method is characterised in that it is determined that the particle condition is satisfied when the at least one target particle is arranged in the buffer region and no target particle is arranged in the discharge region, and that the liquid sample is dispensed onto a target particle carrier if the particle condition is satisfied.

27 Claims, 3 Drawing Sheets

(58) Field of Classification Search
CPC ....... B01L 2200/0652; B01L 2200/143; B01L 2300/0663
See application file for complete search history.

(56) References Cited

U.S. PATENT DOCUMENTS

2017/0274689 A1* 9/2017 Rodriguez .......... G01N 35/1016
2017/0307502 A1 10/2017 Mason et al.
2018/0216162 A1* 8/2018 Belhocine .......... C12N 15/1065
2019/0151848 A1 5/2019 Nielsen et al.
2021/0121871 A1* 4/2021 Tourniaire ........... G01N 1/2813

FOREIGN PATENT DOCUMENTS

| EP | 3453455 A1 | 3/2019 |
| WO | 2015142378 A1 | 9/2015 |

* cited by examiner

METHOD FOR DISPENSING A LIQUID SAMPLE BY MEANS OF A DISPENSING APPARATUS

CROSS-REFERENCE TO RELATED APPLICATIONS

The present application is the U.S. national phase of International Application No. PCT/EP2020/083662 filed Nov. 27, 2020, which claims the benefit of and priority to Luxembourgian Patent Application No. 101494 filed Nov. 27, 2019, the entire disclosure of which is incorporated herein by reference.

FIELD

The disclosure relates to a method for dispensing a liquid sample by means of a dispensing apparatus in which it is determined whether a particle condition is satisfied, wherein the determination comprises checking whether at least one target particle present in a liquid of the liquid sample is contained in a monitoring region of the dispensing apparatus, wherein the monitoring region comprises a discharge region and a buffer region, wherein the buffer region is a region from which the at least one target particle is movable into the discharge region during a time delay between the determination of whether the particle condition is satisfied and an output operation of the dispensing apparatus.

The disclosure further relates to a dispensing device for carrying out the method and a dispensing device comprising a dispensing apparatus for dispensing a liquid sample, a determination apparatus for determining whether a particle condition is satisfied, wherein the determination comprises checking whether at least one target particle present in a liquid of the liquid sample is contained in a monitoring region of the dispensing apparatus, wherein the monitoring region comprises a discharge region and a buffer region, wherein the buffer region is a region from which the at least one target particle is movable into the discharge region during a time delay between the determination of whether the particle condition is satisfied and an output operation of the dispensing apparatus.

The disclosure also relates to a computer program, a data carrier on which the computer program is stored and a data carrier signal that the computer program transmits.

BACKGROUND

It is known from the prior art that active substances, such as monoclonal antibodies and other proteins, are produced with the aid of so-called monoclonal cell lines. These are populations of cells that are all descended from a single parent cell. The production of monoclonal cell lines is necessary because this is the only way to ensure that all cells of the population have approximately the same genome in order to produce the active ingredients with constant and reproducible quality.

In order to produce a monoclonal cell line, cells are transferred individually into the containers of a microtiter plate. The cells to be transferred are produced by genetically modifying a host cell line and isolating these modified cells. The depositing of individual cells into the microtiter plate containers is done, for example, by a dispensing device.

On the part of the users, there is a requirement for the dispensing operation to be performed as fast as possible so that a large number of cells can be processed per day in laboratory operation. However, in addition to the fast dispensing operation, it must also be ensured that a predetermined number of cells, in particular a single cell, are dispensed in each case per dispensing operation.

A dispensing method is known from EP 3 222 353 B1, in which a dispensing operation depends on a single-particle condition. This involves checking whether a discharge region of a droplet dispenser contains a single particle and whether a sedimentation region arranged adjacent to the discharge region is free of particles. If this is the case, the particle condition is satisfied and the droplet is dispensed onto a target. In the event that the condition is not satisfied, the droplet is dispensed onto a reject carrier. Dispensing onto the reject carrier occurs even if no particle is arranged in the discharge region and a particle is arranged in the sedimentation region.

A disadvantage of the dispensing method is that there are often cases where the discharge region does not contain a target cell and the sedimentation region contains a first target cell. Since the present case according to EP 3 222 353 B1 thus leads to a direct discharge of the cell-free sample part in the discharge region, the first target cell from the sedimentation region thereby advances into the discharge region. If there is then no second target cell in the sedimentation region, the first can be ejected individually, albeit with a delay. However, often a second target cell is already in the sedimentation region and the first target cell is discarded into the reject container. Thus, there are frequent losses of target cells and operation is delayed.

SUMMARY

The object of the disclosure is to provide a method by means of which dispensing operations can be carried out efficiently.

The object of the disclosure is achieved by a method of the kind mentioned above, characterised in that it is determined that the particle condition is satisfied when the at least one target particle is arranged in the buffer region and no target particle is arranged in the discharge region, and that the liquid sample is dispensed onto a target particle carrier if the particle condition is satisfied.

A further object of the disclosure is to provide a dispensing device by means of which dispensing operations can be carried out efficiently.

The object of the disclosure is achieved by a dispensing device of the kind mentioned above, characterised in that the determination apparatus determines that the particle condition is satisfied when the at least one target particle is arranged in the buffer region and no target particle is arranged in the discharge region, and in that a control device is provided for causing the liquid sample to be dispensed onto a target particle carrier if the particle condition is satisfied.

According to the disclosure, it has been recognised that the number of output operations in which the liquid sample is incorrectly dispensed onto a collecting carrier can be reduced. This is possible because it is exploited that during the time delay the particle moves from the buffer region to the discharge region, e.g. by sedimentation and/or afterflow. Since there is always a time delay between determining whether the particle condition is satisfied and the output operation, taking the time delay into account in the dispensing decision thus results in an efficient method. The method is carried out automatically in the dispensing device.

The term "target particle" should be understood as a generic term encompassing both solid organic or inorganic microparticles as well as biological cells. The liquid sample has a liquid and target particles, for example cells. The liquid of the liquid sample can have a composition that is conducive to cell growth. The target particle can alternatively be a glass or polymer bead and have substantially the same volume as the cell. The liquid sample can have cells and/or glass or polymer beads in addition to the liquid.

The discharge region comprises a partial region of the dispensing apparatus, in particular of an output channel of the dispensing apparatus. In addition, the discharge region can include an outlet opening of the dispensing apparatus through which the liquid sample is dispensed from the dispensing apparatus. Here, the discharge region corresponds to a geometric region of the dispensing apparatus in which the liquid sample is arranged to be dispensed during the next dispensing operation. The geometric region is selected such that a particle arranged in the discharge region can be dispensed during the next dispensing operation. The discharge region thus depends on the design of the dispensing apparatus, in particular the output channel. In addition, the discharge region also depends on the output volume. The larger the output volume, the larger the discharge region. The output volume is usually specified by the user, so the output area is determined by the user.

Here, hydrodynamic effects, particularly related to inertia, density, deformability, and shape of the particles, influence whether a particle arranged in the discharge region is dispensed during the next dispensing operation. To understand this, it is helpful to imagine that a particularly inert particle will only move with a delay and initially more slowly at the onset of flow. Furthermore, particles, especially smaller ones, can be close to the wall and thus move forward only slowly. This means that without a precise knowledge of the position in three-dimensional space, the shape, density, etc. of the particle and the flow in the dispensing apparatus, the discharge region cannot be sharply defined. Due to this uncertainty, the discharge region can have a border region. The border region is the region of the discharge region that is arranged adjacent to the buffer region. In this regard, the border region is located immediately adjacent to the buffer region. The border region is a region of the discharge region where one is not sure if the target particle located in the border region will be discharged during the next dispensing operation. Whether the target particle is discharged during the next dispensing operation depends on the factors mentioned above.

The buffer region corresponds to a region arranged upstream of the discharge region. In this regard, the buffer region is arranged immediately adjacent to the discharge region. The buffer region corresponds to a region where a particle located in the buffer region can move into the discharge region during the time delay between the determination of whether the particle condition is satisfied and the output operation by the dispensing apparatus. The greater the time delay or the movement, the larger the buffer region. The movement can result due to a force acting on the target particle, such as a weight force. Alternatively or in addition, other forces acting on the target particle, such as a magnetic force and/or a flow force, etc., can cause the particle to move into the discharge region.

The liquid sample dispensed from the dispensing device can have no target particle. Alternatively, the dispensed liquid sample can have a single target particle. In addition, the dispensed liquid sample can have more than a single target particle.

The liquid sample dispensed by means of the dispensing device can be an, in particular free-flying, droplet. In this case, the dispensing of the sample can be performed according to a drop-on-demand mode of operation. In this case, the dispensing device provides a discrete and not a continuous dispensing of the sample. To implement the drop-on-demand mode of operation, the dispensing device can have an actuating means, which can, for example, be a piezoelectrically operated actuator. The dispensing apparatus can have a section, particularly a mechanical diaphragm, that is actuatable by the actuating means. When the actuating means is actuated, the liquid sample, in particular a droplet, is discharged from the dispensing apparatus.

The time delay corresponds to the time interval between determining whether the particle condition is satisfied and the output operation with which the liquid sample is dispensed from the dispensing apparatus. The time delay depends on the amount of time required for the control device to cause the actuating means to actuate the dispensing apparatus, plus the amount of time required for the actual actuation process, particularly the actuation by the actuating means. The time delay can be stored in an electrical memory. In addition, a time delay can be fixed by the user and/or changed during operation of the dispensing device. Specifying the time delay provides the advantage that the size of the buffer region can be specified in a simple manner and does not depend on the components of the dispensing device.

Furthermore, the time delay can be adjusted according to the particle distribution in the dispensing apparatus. This is particularly advantageous when a particle is located in a border region, which is explained in more detail below. A longer time delay can then be used to ensure that the particle moves to the desired region, such as the buffer region or the discharge region. In particular, this can ensure that a particle located in the border region moves safely into the discharge region. In this manner, it can be ensured for a given particle distribution that the desired number of particles is discharged in each case.

The output volume corresponds to the volume dispensed during a dispensing operation. The output volume can also be adjusted depending on the particle distribution in the dispensing apparatus. Here, an increase in output volume can be viewed as an increase of the discharge region and displacement of the buffer region. This concept applies analogously to a reduction in the output volume. In this manner, it can be ensured for a given particle distribution that the desired number of particles is discharged in each case.

Alternatively, the dispensed liquid sample can be a liquid jet, which, after being dispensed from a dispenser of the dispensing device, disintegrates into individual liquid droplets.

The dispensing device can be a droplet generator. The liquid droplet can have a volume ranging from 1 pl (picoliter) to 1 μL (microliter).

The target particle carrier can be a container bottom to which the liquid sample is applied. In this case, the container can be part of a microtiter plate that has a plurality of containers. Alternatively, the target particle carrier can be a flat plate to which the liquid sample is applied. Similarly, the collecting carrier can be a bottom of a collecting container to which the liquid sample is applied. The liquid samples deposited on the collecting carrier can be processed during other examinations. Alternatively, the collecting carrier can be a reject carrier if the deposited liquid samples are not processed further.

The collecting carrier can be arranged laterally relative to the dispensing apparatus so that the liquid sample can be deflected toward the collecting carrier by a sample deflection mechanism after discharge. Such deflection can be achieved, for example, by an air flow or an electric field. Alternatively, the dispensing device can include a sample collection mechanism, which is configured to move the collecting carrier into the trajectory of the discharged liquid samples to collect the liquid sample and also to move the collecting carrier out of the trajectory.

In a particular embodiment, the determination apparatus can additionally determine that the particle condition is satisfied if the target particle is arranged in the discharge region and no target particle is arranged in the buffer region. This provides the advantage of ensuring that the dispensed liquid sample contains a target particle. This increases the efficiency of the dispensing operation because fewer dispensing operations are incorrectly dispensed onto the collecting carrier. The determination of whether the target particle is arranged in the discharge region and no target particle is arranged in the buffer region can be made at a time before or after or at the same time as the previously described determination of whether the target particle is arranged in the buffer region and no target particle is arranged in the discharge region.

Furthermore, the determination apparatus can determine that the particle condition is satisfied if, in addition to the target particle, at least one other particle, which is not a target particle, is arranged in the discharge region and/or the buffer region. The other particle can be, for example, a dust particle or a cell fragment or a dead cell or a cell type of no interest to the analysis. The other particle also does not have a harmful effect on the target particle, so the other particle can be dispensed onto the target particle carrier together with the cell particle. As a result, the other particle can be a non-interfering particle, especially during processing of the target particle.

In a particular embodiment, the determination apparatus can determine whether a predetermined number of target particles are contained in the monitoring region. The predetermined number can have a value of 1 or greater than 1. In particular, it can be determined whether a single target particle is contained in the monitoring region, especially in the buffer region or the discharge region. Alternatively, embodiments are possible in which it is determined whether more than a single target particle is contained in the monitoring region.

In addition, the determination apparatus can determine whether the target particle has a predetermined property. In particular, the size and/or morphology and/or granularity and/or colour of the target particle can be determined. This allows target particles to be easily distinguished from the other particles mentioned above. In particular, it is easy to detect whether a detected particle is incorrectly considered a target particle. Thus, it can be achieved that the dispensing operation depends on at least one property of the target particle.

It is particularly advantageous to define a minimum size for relevant particles. In practice, the detection of small artefacts that are not intended to be target particles can often occur. These artefacts can be caused, for example, by noise or, in the case of imaging detection, by vibrations. Provided that the determined particle is smaller than the minimum size, the particle is considered to be an other particle, in particular a non-interfering particle.

As a result, it is possible to avoid incorrectly dispensing the sample onto the collecting carrier because, for example, a dust particle or artefact has been identified as the target particle and thus it is assumed that multiple target particles are arranged in the monitoring region. Alternatively or in addition, dispensing of the sample onto the collecting carrier because there are cells arranged in the discharge region and/or the buffer region that are not relevant to the user because, for example, they are dead cells and/or are of a cell type of no interest to the user can be avoided. The result is a reduction in the number of output operations that are incorrectly dispensed onto the collecting carrier.

In a particular embodiment, the liquid sample can be dispensed onto the collecting carrier if the particle condition is not satisfied. The determination apparatus can determine that the particle condition is not satisfied if more than a predetermined number of target particles, in particular more than a single target particle, are arranged in the monitoring region. Alternatively, the determination apparatus can determine that the particle condition is not satisfied if less than the predetermined number of target particles, in particular none, are arranged in the monitoring region. In both cases, the liquid sample is dispensed onto the collecting carrier. The determination of the number of target particles can be performed after determining the property of the target particles.

The determination of the number of target particles and/or the property of the target particles can be based on at least one imaging of the monitoring region, in particular the discharge region and the buffer region. For this purpose, the determination apparatus can include an imaging device, such as a camera, that produces the image. Furthermore, the determination apparatus can have an evaluation apparatus by means of which the number of target particles and/or property of the target particles are evaluated based on the generated image.

The evaluation apparatus can be part of the imaging device. Alternatively, the evaluation apparatus can be part of a computer. The control device can also be part of the computer. Alternatively, the control device can be part of another computer.

The control device can control the actuating means by which the dispensing apparatus is actuated in such a manner that the output time during which the liquid sample is dispensed from the dispensing apparatus is changed if the particle condition is not satisfied. This allows more or less liquid sample to be dispensed from the dispensing apparatus per output operation. A new check to see whether the particle condition is satisfied is performed after the liquid sample has been dispensed.

The control device can control the actuating means by which the dispensing apparatus is actuated in such a manner that the output volume during which the liquid sample is dispensed from the dispensing apparatus is changed if the particle condition is not satisfied. This allows more or less liquid sample to be dispensed from the dispensing apparatus per output operation. A new check to see whether the particle condition is satisfied is performed after the liquid sample has been dispensed.

Alternatively or in addition, the time delay can be changed if the particle condition is not satisfied. This increases or decreases the size of the buffer region. In particular, the time can be increased such that the buffer region becomes large enough to contain a target particle. This can ensure that at the next dispensing of the sample, the liquid sample contains a target particle, wherein in this case the discharge region does not contain a target particle. A new check to see whether the particle condition is satisfied is performed after the liquid sample has been dispensed.

Alternatively or in addition, a predetermined number of output operations can be performed if the particle condition is not satisfied. This allows the portion of the liquid sample that is not of interest to be quickly discharged from the dispensing device in a simple manner. After the specified number of output operations has been performed, it can be determined again whether the particle condition is satisfied.

The dispensing device can have a moving apparatus. The dispensing apparatus and/or the target particle carrier and/or the collecting carrier can be moved by means of the moving apparatus. The moving operation can depend on whether the liquid sample to be dispensed is to be dispensed onto the target particle carrier or onto the collecting carrier. Thus, the liquid sample is dispensed onto the collecting carrier if the particle condition is not satisfied. In contrast, the dispensed liquid sample can be dispensed onto the target particle carrier if a single target particle is arranged in the liquid sample.

In this regard, the time can may depend on a time duration of a moving operation from the dispensing apparatus and/or the target particle carrier to an output position in which the liquid sample is dispensed onto the target particle carrier. This provides an efficient dispensing method because the forced time delay that occurs during the moving operation is taken into account for the dispensing decision. Alternatively or in addition, the time delay can depend on the duration of a switching operation of the sample deflection mechanism or the sample interception mechanism. A time delay can be stored in an electrical memory, which is usually required for the moving operation. The time delay can be determined and stored alternatively or additionally during operation. Thus, the size of the buffer region can change during operation of the dispensing device.

The buffer region can have a border region. The border region is the region of the buffer region that is arranged adjacent to a residual region of the dispensing apparatus. In this regard, the border region is located immediately adjacent to the residual region. The residual region of the dispensing apparatus is understood to be a region that is not part of the monitoring region and is therefore not considered when checking the particle condition. The border region is a region of the buffer region where it is uncertain whether the target particle located in the border region will move into the discharge region during the time delay. Thus, the border region can have one target particle that moves into the discharge region during the time delay and another target particle that does not move into the discharge region during the time delay. Whether the target particle moves into the discharge region depends on the factors described below.

In a particular embodiment, the determination apparatus can determine whether the target particle is arranged in the border region. In this regard, the determination apparatus can determine that the particle condition is not satisfied if the target particle is arranged in the border region. Alternatively, the time delay and/or the output volume can be adjusted so that the target particle is no longer in the border region but is arranged in the residual part of the buffer region.

Providing for the border region takes into account that the check as to whether the particle condition is satisfied is based on two-dimensional imaging. However, it is not clear from the imaging whether the target particle is arranged in the centre of the dispensing apparatus, in particular the output channel, or closer to the edge. This is relevant because the velocity of the target particle, especially for small target particles, depends on its position in the dispensing apparatus. In addition, the border region takes into account hydrodynamic effects resulting from the inertia, density, deformability, and shape of the particles. To understand this, it is helpful to imagine that a particularly inert particle will only move with a delay and initially more slowly at the onset of flow. This means that even though the target particle is located in the buffer region, it is possible that the target particle may not move into the discharge region during the time delay. As a result, without an accurate knowledge of the position in three-dimensional space, shape, density, etc. of the target particle and the flow in the dispensing apparatus, the buffer region cannot be sharply defined and/or sharply delineated from the residual region. Therefore, it is advantageous to consider a border region of the buffer region in the dispensing decision. Therefore, it can be advantageous to introduce further regions, especially further border regions.

The dispensing apparatus can have a further region arranged upstream of the monitoring region. In this case, the further region can be located spaced apart from the buffer region and/or the discharge region. Thus, the further region may not be immediately adjacent to the discharge region and/or the buffer region. In particular, a portion of the residual region can be arranged between the further region and the monitoring region. However, this further region can also be arranged directly adjacent to the buffer region, in particular the border region.

The determination apparatus can determine whether a target particle is arranged in the further region. In the event that the particle condition is not satisfied and a target particle is arranged in the further region, the control device can control the actuating means in such a manner that the output time during which the liquid sample is dispensed from the dispensing apparatus is increased. Alternatively or in addition, the output volume can be increased before checking again whether the particle condition is satisfied. Alternatively or in addition, the time delay can be increased and/or a predetermined number of output operations can be performed before checking again whether the particle condition is satisfied. All of these methods take advantage of the knowledge that the liquid samples to be dispensed in the next dispensing operations are not of interest and therefore should be dispensed onto the collecting carrier. Therefore, there is no need for a time-consuming determination as to whether the particle condition is satisfied for these liquid samples to be dispensed. As a result, output operations can be performed quickly.

The dispensing apparatus can, in turn, be detachably connected to the remaining parts of the dispensing device, in particular mechanically. As a result, the dispensing apparatus can be replaced in a straightforward manner.

The dispensing device can include the sample deflection mechanism for deflecting the dispensed liquid samples and/or the sample interception mechanism for intercepting the dispensed liquid sample. The sample is deflected or intercepted before it hits the target particle carrier. Here, deflection and/or interception of the dispensed liquid sample can depend on whether the particle condition is satisfied.

Of particular advantage is a dispensing device comprising means by which a method according to the disclosure can be carried out. In addition, a computer program comprising instructions which, when the program is executed by a computer, cause the computer to carry out the method according to the disclosure is of particular advantage. A data carrier on which the computer program according to the disclosure is stored is also advantageous. In addition, a data carrier signal that transmits a computer program according to the disclosure is advantageous.

BRIEF DESCRIPTION OF THE DRAWING VIEWS

The subject matter of the disclosure is shown schematically in the figures, wherein elements that are the same or have the same effect are mostly provided with the same reference symbols. In the drawings.

DETAILED DESCRIPTION

Figure 1:
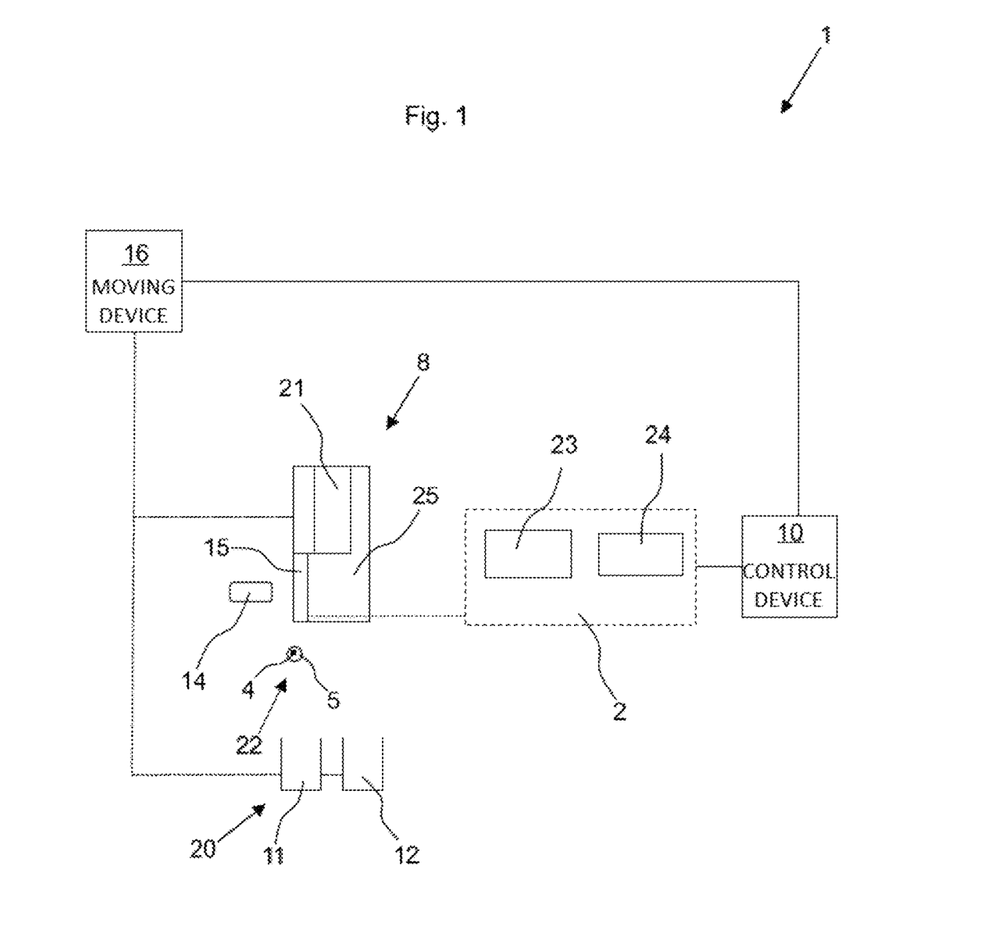
FIG. 1 shows a schematic representation of the dispensing device according to the disclosure.

FIG. 1 shows a schematic representation of a dispensing device 1. The dispensing device 1 has a dispensing apparatus 8 by means of which a liquid sample 22 can be dispensed. The dispensed liquid sample 22 has a liquid 5 and a single target particle 4. Furthermore, the dispensing device 1 has an actuating means 14 that is used to actuate the dispensing apparatus 8. The liquid sample 22 is dispensed by the dispensing apparatus 8 by the actuating means 14 actuating the dispensing apparatus 8. The liquid sample 22 can be dispensed onto a target particle carrier 11 or onto a collecting carrier 12. The target particle carrier 11 and the collecting carrier 12 are each formed as one container. The target particle carrier 11 is in an output position 20 where it can receive the dispensed liquid sample 20.

The dispensing apparatus 1 also has a moving device 16 by means of which the dispensing apparatus 8 and/or the target particle carrier 11 and/or the collecting carrier 12 are moved, as shown by the dashed line. The moving device 16 is electrically connected to a control device 10 of the dispensing device 1. In this regard, the control device 10 controls the moving operation of the dispensing apparatus 8 and/or the target particle carrier 11 and/or the collecting carrier 12 by means of the moving device 16.

The dispensing device 1 also has a determination apparatus 2 by means of which it is determined whether a particle condition is satisfied. The determination apparatus 2 has an imaging apparatus 23 and an evaluation apparatus 24 and is electrically connected to the control device 10. The imaging apparatus 23 generates at least one image of the dispensing apparatus 8, in particular of at least a portion of an output channel 15 of the dispensing apparatus 8. The image shows at least one monitoring region 3. In addition, the imaging device 23 can also produce an image showing a further region 19. The same image can show both the monitoring region 3 shown in FIG. 2 and the further region 19. The light emitted or received by the imaging device 23 to produce the image is shown as dashed lines. The evaluation apparatus 24 evaluates the generated image and transmits the evaluation result to the control device 10.

The dispensing apparatus 8 has a fluid chamber 21. The liquid sample 22 is introduced into the fluid chamber 21 through an opening of the fluid chamber 21. Furthermore, the dispensing apparatus 8 has the output channel 15. The output channel 15 is fluidically connected to the fluid chamber 21. In this regard, the liquid sample 22 is dispensed from the dispensing apparatus 8 through the output channel 15. The output channel 15 and the fluid chamber 21 are delimited by a transparent wall 25 of the dispensing apparatus 8. The actuating means 14 and the determination apparatus 12 are opposite each other with respect to the dispensing apparatus 8.

Figure 2:
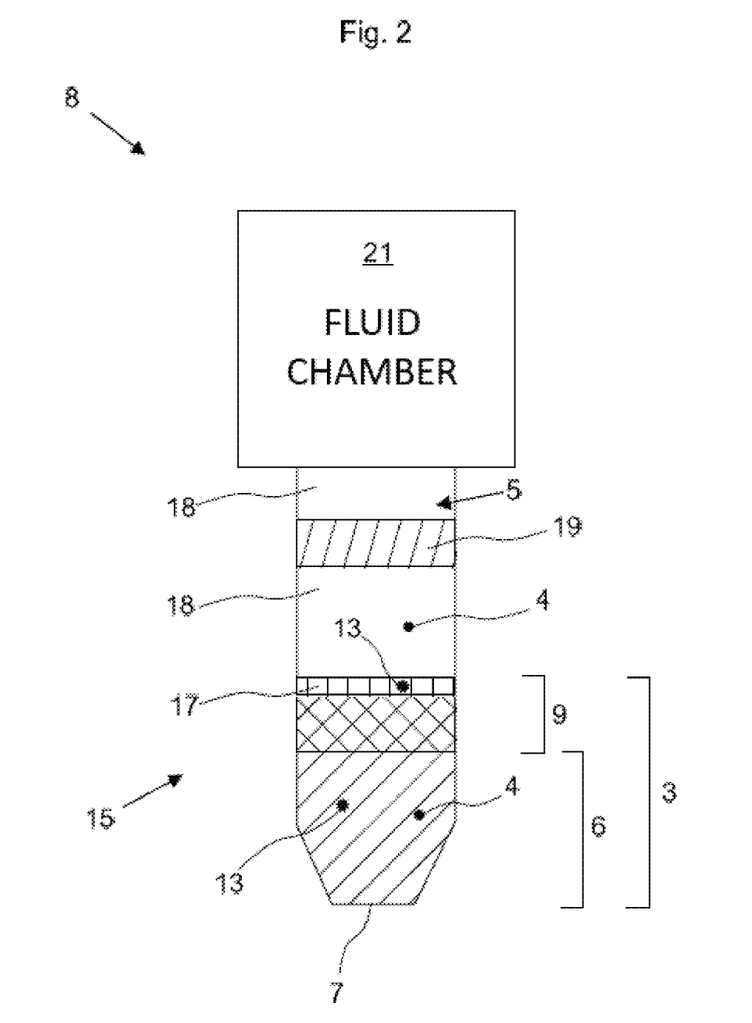
FIG. 2 shows a part of a dispensing apparatus of the dispensing device according to the disclosure shown in FIG. 1.

FIG. 2 shows part of the dispensing apparatus 8 shown in FIG. 1. An outlet opening 7 of the output channel 15 is arranged at an end of the output channel 15 remote from the fluid chamber 21. The liquid sample 22 located in the output channel 15 has a liquid 5 and target particles 4. The liquid sample 22 is discharged from the output channel 15 via the outlet opening 7.

To decide whether to dispense the liquid sample 22 onto the target particle carrier 11 or onto the collecting carrier 12, the monitoring region 3 of the output channel 15 is considered. The monitoring region 3 has a discharge region 6 and a buffer region 9. The discharge region 6 can include the outlet opening 7 and includes the region of the output channel 15 containing the liquid sample 22 to be dispensed in the next output operation. Furthermore, the discharge region 6 is selected to ensure that the target particles 4 arranged in the discharge region 6 are discharged during the next dispensing operation. The buffer region 9 corresponds to a region of the output channel 15 where a target particle 4 moves into the discharge region 6 during a time delay between determining whether the sample condition is satisfied and the discharge operation. The movement of the target particle 4 results, for example, due to the gravitational force.

The buffer region 9 has a border region 17. In this regard, the border region 17 is arranged at the end of the buffer region 9 remote from the discharge region 6. In particular, the border region 17 is arranged immediately adjacent to a residual region 18 of the output channel 15. The residual region 18 is not used to determine whether the particle condition is satisfied.

The monitoring region 3 is monitored by the determination apparatus 2. In particular, at least one image of the monitoring region 3 is generated by means of the imaging apparatus 23, which is then evaluated by the evaluation apparatus 24.

Furthermore, a further region 19 of the output channel 15 is considered. The further region 19 is arranged upstream of the buffer region 9 and/or the discharge region 6. In this regard, the further region 19 is arranged spaced apart from the buffer region 9. In particular, the further region 19 is separated from the buffer region 9 by a portion of the residual region 18. The further region 19 is also monitored by the determination apparatus 2. In this regard, at least one image of the further region 19 is generated by means of the imaging device 23. The further region 19 is not used to determine whether the particle condition is satisfied.

In the embodiment shown in FIG. 2, a target particle 4 is arranged in the discharge region 6. In addition, a further particle 13, in particular a non-interfering particle, which is not a target particle but, for example, a dust particle, is located in the discharge region 6 and the border region 17. No target particle 4 is arranged in the buffer region 9. In addition, a further target particle 4 is located in the residual region 18. No target particle 4 is contained in the further region 19.

Figure 3:
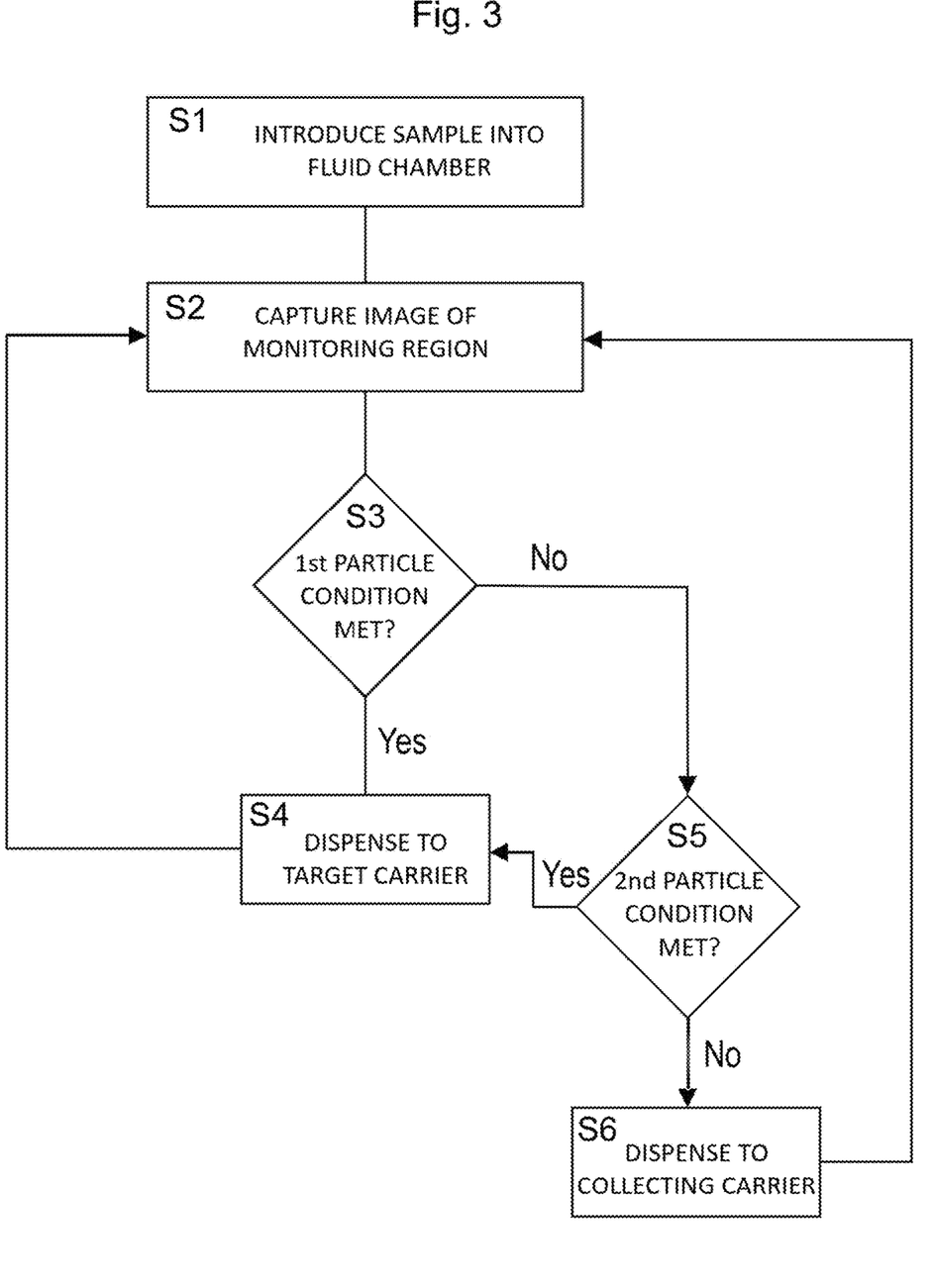
FIG. 3 shows a flow chart of a method according to the disclosure.

FIG. 3 shows a flow chart of the method according to the disclosure. In a first method step S1, the liquid sample 22 comprising the liquid 5 and the target particles 4 is introduced into the fluid chamber 21 by the user. The liquid sample 22 partially flows from the fluid chamber 21 into the output channel 15. In a second method step S2, the imaging device 23 captures an image of the monitoring region 3, in particular the discharge region 6 and the buffer region 9.

Subsequently, in a third method step S3, the determination apparatus 2 determines whether a first particle condition is satisfied based on the generated image. In particular, in the third method step S3, it is determined whether a predetermined number of target particles 4, in particular a single target particle 4, are arranged in the buffer region 9 and no target particle 4 is arranged in the discharge region 6.

Provided that the first particle condition is satisfied, in a fourth method step S4, the control device 10 causes the liquid sample 22 to be dispensed onto the target particle carrier 11. For this purpose, the control device 10 can control the moving device 16 in such a manner that the target particle carrier 11 is moved to the output position 20. This is followed by the output operation. Thereupon, a new image of the monitoring region 3 is generated again by means of the imaging device 23 in the second method step S2.

If, on the other hand, it is determined in the third method step S3 that the first particle condition is not satisfied, a fifth method step S5 checks whether a second particle condition is satisfied. In particular, it is checked whether a predetermined number of target particles 4, in particular a single target particle 4, are arranged in the discharge region 6 and no target particle 4 is arranged in the buffer region 9. Provided that the second particle condition is satisfied, in the fourth method step S4 the control device 10 causes the liquid sample 22 to be dispensed onto the target particle carrier 11.

If the second particle condition is not satisfied, the control device 10 causes the liquid sample 22 to be dispensed onto the collecting carrier 12 at a sixth method step S6. For this purpose, the control device 10 can control the moving device 16 in such a manner that the collecting carrier 12 is moved to the output position 20. This is followed by the output operation. Thereupon, a new image of the monitoring region 3 is generated again by means of the imaging device 23 in the second method step S2.

LIST OF REFERENCE SYMBOLS

1 Dispensing device
2 Determination apparatus
3 Monitoring region
4 Target particle
5 Liquid
6 Discharge region
7 Outlet opening
8 Dispensing apparatus
9 Buffer region
10 Control device
11 Target particle carrier
12 Collecting carrier
13 Other particle
14 Actuating means
15 Output channel
16 Moving device
17 Border region
18 Residual region
19 Further region
20 Output position
21 Fluid chamber
22 Liquid sample
23 Imaging apparatus
24 Evaluation apparatus
25 Wall
S1-S6 Method steps

What is claimed is:

1. A method for dispensing a liquid sample (22) by a dispensing apparatus (8), comprising steps of:
making a determination as to whether a particle condition is satisfied, wherein making the determination comprises checking whether at least one target particle (4) present in a liquid (5) of the liquid sample (22) is contained in a monitoring region (3) of the dispensing apparatus (8), wherein the monitoring region (3) comprises a discharge region (6) and a buffer region (9), wherein the buffer region (9) is a region from which the at least one target particle (4) is movable into the discharge region (6) during a time delay between the determination of whether the particle condition is satisfied and an output operation of the dispensing apparatus (8), wherein the particle condition is determined to be satisfied when the at least one target particle (4) is arranged in the buffer region (9) and no target particle (4) of the at least one target particle (4) is arranged in the discharge region (6), and
dispensing the liquid sample (22) onto a target particle carrier (11) if the particle condition is determined to be satisfied.

2. The method according to claim 1, wherein the particle condition is additionally determined to be satisfied if the at least one target particle (4) is arranged in the discharge region (6) and no target particle (4) of the at least one target particle (4) is arranged in the buffer region.

3. The method according to claim 1, wherein the particle condition is determined to be satisfied if, in addition to the at least one target particle (4), at least one other particle (13), which is not a target particle (4) of the at least one target particle (4), is arranged in the buffer region (9).

4. The method according to claim 1, wherein the step of making the determination as to whether the particle condition is satisfied includes
a) determining whether a predetermined number of target particles (4) of the at least one target particle (4) are contained in the monitoring region (3) and/or
b) determining whether the at least one target particle (4) has a predetermined property.

5. The method according to claim 1, further comprising dispensing the liquid sample onto a collecting carrier (12) if the particle condition is not determined to be satisfied.

6. The method according to claim 5, wherein the particle condition is not determined to be satisfied if
a) more than a predetermined number of the at least one target particle (4) are arranged in the monitoring region (3) or if
b) less than the predetermined number of the at least one target particle (4) are arranged in the monitoring region (3).

7. The method according to claim 5, wherein if the particle condition is not determined to be satisfied,
a) an output time during which the liquid sample (22) is dispensed from the dispensing apparatus (8) is changed, and/or
b) an output volume of the liquid sample (22) dispensed from the dispensing apparatus (8) is changed, and/or
c) the time delay is changed, and/or
d) a predetermined number of output operations are performed before again making a determination as to whether the particle condition is satisfied.

8. The method according to claim 1, wherein
a) the time delay depends on a time duration of a moving operation during which the dispensing apparatus (8) and/or the target particle carrier (11) are/is moved to an output position (20) in which the liquid sample is dispensed onto the target particle carrier (11), and/or
b) the time delay depends on a time duration of a switching operation of a sample deflection mechanism or a sample interception mechanism.

9. The method according to claim 1, wherein the buffer region (9) comprises a border region (17) arranged adjacent to a residual region (18) of the dispensing apparatus (8), and wherein the step of making the determination as to whether the particle condition is satisfied includes determining whether the at least one target particle (4) is arranged in the border region (17).

10. The method according to claim 9, wherein the particle condition is not determined to be satisfied when the at least one target particle (4) is arranged in the border region (17).

11. The method according to claim 1, wherein the dispensing apparatus (8) comprises a further region (19) arranged upstream of the monitoring region (3), wherein the method comprises determining whether a target particle (4) of the at least one target particle (4) is arranged in the further region (19).

12. The method according to claim 11, wherein if the particle condition is not determined to be satisfied and if a target particle (4) of the at least one target particle (4) is arranged in the further region (19),
   a) an output time during which the liquid sample is dispensed from the dispensing apparatus (8) is changed, and/or
   b) an output volume of the liquid sample (22) from the dispensing apparatus (8) is changed, and/or
   c) the time delay is changed and/or
   d) a predetermined number of output operations are performed before again making a determination as to whether the particle condition is satisfied.

13. A dispensing device (1) comprising:
   a dispensing apparatus (8) for dispensing a liquid sample (22),
   a determination apparatus (2) for making a determination as to whether a particle condition is satisfied, wherein the making the determination comprises checking whether at least one target particle (4) present in a liquid (5) of the liquid sample is contained in a monitoring region (3) of the dispensing apparatus (8), wherein the monitoring region (3) comprises a discharge region (6) and a buffer region (9), wherein the buffer region (9) is a region from which the at least one target particle (4) is movable into the discharge region (6) during a time delay between the determination of whether the particle condition is satisfied and an output operation of the dispensing apparatus (8), wherein the determination apparatus (2) is configured to determine that the particle condition is satisfied when the at least one target particle (4) is arranged in the buffer region (9) and no target particle (4) of the at least one target particle (4) is arranged in the discharge region (6), and
   a control device (10) configured to cause the dispensing apparatus (8) to dispense the liquid sample (22) onto a target particle carrier (11) if the particle condition is determined to be satisfied.

14. The dispensing device (1) according to claim 13, wherein the determination apparatus (2) is additionally configured to determine that the particle condition is satisfied when the at least one target particle (4) is arranged in the discharge region (6) and no target particle (4) of the at least one target particle (4) is arranged in the buffer region (9).

15. The dispensing device (1) according to claim 13, wherein the determination apparatus (2) is configured to determine that the particle condition is satisfied when, in addition to the at least one target particle (4), at least one other particle (13), which is not a target particle (4) of the at least one target particle (4), is arranged in the buffer region (9).

16. The dispensing device (1) according to claim 13, wherein
   a) the determination apparatus (2) is configured to determine whether a predetermined number of target particles (4) of the at least one target particle (4) is contained in the monitoring region (3) to determine whether the particle condition is satisfied and/or
   b) the determination apparatus (2) is configured to determine whether the at least one target particle (4) has a predetermined property to determine whether the particle condition is satisfied.

17. The dispensing device (1) according to claim 13, wherein the determination apparatus (2) is configured to determine that the particle condition is not satisfied if
   a) more than a predetermined number of the at least one target particle (4) are arranged in the monitoring region (3) or if
   b) less than the predetermined number of the at least one target particle (4) are arranged in the monitoring region (3).

18. The dispensing device (1) according to claim 13, further comprising:
   actuating means (14) for actuating the dispensing apparatus (8), wherein the control device (10) is configured to control the actuating means (14) such that
   a) an output time during which the liquid sample (22) is dispensed from the dispensing apparatus (8) is changed if the particle condition is not determined to be satisfied, and/or
   b) an output volume of the liquid sample (22) dispensed from the dispensing apparatus (8) is changed if the particle condition is not determined to be satisfied, and/or
   c) the time delay is changed if the particle condition is not determined to be satisfied, and/or
   d) a predetermined number of output operations are performed before the determination apparatus (2) again makes a determination as to whether the particle condition is satisfied if the particle condition is not determined to be satisfied.

19. The dispensing device (1) according to claim 13, further comprising:
   a moving device (16) for moving the dispensing apparatus (8) and/or the target particle carrier (11), wherein the time delay depends on a time duration of a moving operation during which the dispensing apparatus (8) and/or the target particle carrier (11) are/is moved to an output position (20) in which the liquid sample (22) can be dispensed onto the target particle carrier (11).

20. The dispensing device (1) according to claim 13, further comprising:
   a sample deflection mechanism for deflecting the dispensed liquid sample before the dispensed liquid sample impacts the target particle carrier (11), or a sample interception mechanism for intercepting the dispensed liquid sample before the dispensed liquid sample impacts the target particle carrier (11).

21. The dispensing device (1) according to claim 13, wherein the determination apparatus (2) is configured to determine whether the at least one target particle is arranged in a border region (17) of the monitoring region (3), wherein the border region (17) is arranged adjacent to a residual region (18) of the dispensing apparatus (8).

22. The dispensing device (1) according to claim 21, wherein the determination apparatus (2) is configured to determine that the particle condition is not satisfied when the at least one target particle (4) is arranged in the border region (17).

23. The dispensing device (1) according to claim 13, wherein the dispensing apparatus (8) comprises a further region (19) arranged upstream of the monitoring region (3), wherein the determination apparatus (2) is configured to determine whether a target particle (4) of the at least one target particle (4) is arranged in the further region (19).

24. The dispensing device (1) according to claim 23, wherein the dispensing device (1) comprises actuating means (14) for actuating an output channel (15) of the dispensing apparatus (8), wherein the control device (10) is configured to control the actuating means (14) such that if the particle condition is not determined to be satisfied and when a target particle (4) of the at least one target particle (4) is arranged in the further region (19),
 a) an output time during which the liquid sample (22) is dispensed from the dispensing apparatus (8) is increased and/or
 b) an output volume of the liquid sample (22) dispensed from the dispensing apparatus (8) is changed, and/or
 c) the time delay is increased and/or
 d) a predetermined number of output operations are performed before the determination apparatus (2) again makes a determination as to whether the particle condition is satisfied.

25. A non-transient computer readable storage medium comprising a computer program comprising commands that, when the computer program is executed by a computer, cause the computer to carry out the method according to claim 1.

26. The method according to claim 2, wherein the particle condition is determined to be satisfied if, in addition to the at least one target particle (4), at least one other particle (13), which is not a target particle (4) of the at least one target particle (4), is arranged in the discharge region (6).

27. The dispensing device (1) according claim 14, wherein the determination apparatus (2) is configured to determine that the particle condition is satisfied when, in addition to the at least one target particle (4), at least one other particle (13), which is not a target particle (4) of the at least one target particle (4), is arranged in the discharge region (6).

* * * * *